US011128482B2

(12) United States Patent
Asanghanwa et al.

(10) Patent No.: US 11,128,482 B2
(45) Date of Patent: Sep. 21, 2021

(54) METERING CLOUD WORKLOADS AT EDGE COMPUTING DEVICES

(71) Applicant: Microsoft Technology Licensing, LLC, Redmond, WA (US)

(72) Inventors: Eustace Ngwa Asanghanwa, Kirkland, WA (US); Mahesh Sham Rohera, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 16/389,622

(22) Filed: Apr. 19, 2019

(65) Prior Publication Data
US 2020/0336322 A1   Oct. 22, 2020

(51) Int. Cl.
*H04L 12/14* (2006.01)
*H04L 9/08* (2006.01)
(Continued)

(52) U.S. Cl.
CPC .......... *H04L 12/1432* (2013.01); *H04L 9/085* (2013.01); *H04L 9/3213* (2013.01); *H04L 41/5051* (2013.01)

(58) Field of Classification Search
CPC ... H04L 12/1432; H04L 9/085; H04L 9/3213; H04L 41/5051; H04L 63/0435;
(Continued)

(56) References Cited

U.S. PATENT DOCUMENTS

| 7,089,304 B2 * | 8/2006 | Graham | H04L 43/00 709/203 |
| 7,865,442 B1 * | 1/2011 | Sowell | G06Q 50/184 705/59 |

(Continued)

OTHER PUBLICATIONS

"AWS Security Token Service", Retrieved from: https://web.archive.org/web/20150902005431/https/docs.aws.amazon.com/IAM/latest/UserGuide/id_credentials_ temp.html, Sep. 2, 2015, 1 Page.
(Continued)

*Primary Examiner* — Badrinarayanan
*Assistant Examiner* — Badri Champakesan
(74) *Attorney, Agent, or Firm* — Holzer Patel Drennan

(57) ABSTRACT

A system meters execution of an application module at an edge computing device. A secure workload package is transmitted securely from a workload provisioning service to the edge computing device. The secure workload package includes the application module, a trusted metering application, and a provisioning service authentication token. The provisioning service authentication token is verified in the secure workload package based on an edge device authentication token generated at the edge computing device. The trusted metering application is executed in a trusted execution environment of the edge computing device, responsive to verifying the provisioning service authentication token. The application module of the edge computing device is executed, wherein the trusted metering application is configured to monitor execution metrics of the application module on the edge computing device. The execution of the
(Continued)

application module is managed based on the monitored execution metrics.

22 Claims, 4 Drawing Sheets

(51) Int. Cl.
*H04L 9/32* (2006.01)
*H04L 12/24* (2006.01)
(58) Field of Classification Search
CPC ......... H04L 63/0807; G06F 2221/2101; G06F 2221/2135; G06F 21/121; H04W 12/06
USPC .......................................................... 726/9
See application file for complete search history.

(56) References Cited

U.S. PATENT DOCUMENTS

| | | | |
|---|---|---|---|
| 8,401,941 B1* | 3/2013 | Havemose | H04L 29/08072 705/34 |
| 9,197,642 B1* | 11/2015 | Urbach | H04L 65/1066 |
| 9,226,002 B2* | 12/2015 | Huang | H04N 21/234 |
| 9,336,060 B2* | 5/2016 | Nori | G06F 9/5066 |
| 9,633,182 B2* | 4/2017 | Scapa | G06F 21/10 |
| 9,702,731 B2* | 7/2017 | Gopinath | G01D 4/004 |
| 10,754,703 B2* | 8/2020 | Herbert | G06F 9/505 |
| 10,803,432 B1* | 10/2020 | Miles | G06K 7/10 |
| 2002/0007347 A1* | 1/2002 | Blumenthal | G06F 21/123 705/51 |
| 2002/0042730 A1* | 4/2002 | Homer | G06F 21/10 715/203 |
| 2002/0046182 A1* | 4/2002 | Bator | G06Q 30/0601 705/60 |
| 2006/0010076 A1* | 1/2006 | Cutter | G06F 21/10 705/63 |
| 2007/0299789 A1* | 12/2007 | Young | G06Q 30/02 705/400 |
| 2008/0215468 A1* | 9/2008 | Monsa-Chermon | G06Q 30/0283 705/34 |
| 2009/0037287 A1* | 2/2009 | Baitalmal | G06F 21/105 705/27.1 |
| 2010/0262833 A1* | 10/2010 | Zollinger | G11B 20/00253 713/180 |
| 2012/0116937 A1* | 5/2012 | Van Biljon | G06Q 40/00 705/34 |
| 2012/0254024 A1* | 10/2012 | Bose | G06F 21/12 705/40 |
| 2013/0031607 A1* | 1/2013 | Aditya | G06F 21/121 726/3 |
| 2013/0102276 A1* | 4/2013 | Raj | H04W 4/24 455/406 |
| 2013/0185413 A1* | 7/2013 | Beaty | H04L 43/0876 709/224 |
| 2014/0189102 A1* | 7/2014 | Fruchtman | H04L 43/0876 709/224 |
| 2016/0005016 A1* | 1/2016 | Eliahu | G06Q 20/28 705/44 |
| 2016/0094410 A1* | 3/2016 | Anwar | H04L 47/70 709/223 |
| 2016/0127351 A1* | 5/2016 | Smith | H04L 63/12 726/10 |
| 2017/0249610 A1* | 8/2017 | Ferrer | G06F 21/105 |
| 2017/0331804 A1* | 11/2017 | Jellison, Jr. | H04L 63/10 |
| 2017/0339452 A1* | 11/2017 | Newell | H04N 7/1675 |
| 2018/0227128 A1* | 8/2018 | Church | H04L 63/0853 |
| 2019/0165942 A1* | 5/2019 | Subramaniam | G06F 9/30018 |
| 2020/0136824 A1* | 4/2020 | Allen | G06Q 30/0601 |

OTHER PUBLICATIONS

Giba, et al., "Find Your Edge", Retrieved from: https://www.accenture.com/t20180123T065511Z_w_/us-en/_acnmedia/PDF-46/Accenture-Edge-Analytics-POV.pdf, Jan. 25, 2019, 17 Pages.

Gremban, et al., "Azure IoT Edge security manager", Retrieved from: https://docs.microsoft.com/en-us/azure/iot-edge/iot-edge-security-manager, Jul. 30, 2018, 6 Pages.

Malhotra, Varun, "TEE in Android Development", Retrieved from: https://dzone.com/articles/overview-tee-in-android, Jan. 10, 2018, 4 Pages.

Yamini, et al., "Trusted SLA Monitoring for Billing System in Public Cloud computing Environment", In International Journal of Modern Engineering Research, Jul. 2013, pp. 35-41.

"How do I setup/register on Amazon Prime Video with my TV?", Retrieved from: https://www.sony.co.uk/electronics/support/articles/00169780, Aug. 29, 2017, 7 Pages.

Fleishman, Glenn, "How to Find a Digital Movie Rental Longer than 24 Hours", Retrieved from: https://www.macworld.com/article/3139028/how-to-finda-digital-movie-rental-longer-than-24-hours.html, Nov. 7, 2016, 10 Pages.

Gil, Lory, "How to Watch Amazon Prime Videos on iPhone and iPad", Retrieved from: https://www.imore.com/how-watch-amazon-prime-videos-iphone-and-ipad, Feb. 3, 2016, 7 Pages.

Ogasawara, Todd, "You Can Now Download Amazon Prime Instant Videos and Watch Them Offline", Retrieved from: https://www.extremetech.com/mobile/213354-you-can-now-download-amazon-prime-instant-videos-and-watch-them-offline, Sep. 3, 2015, 11 Pages.

"International Search Report and Written Opinion Issued in PCT Application No. PCT/US20/025865", dated May 15, 2020, 11 Pages.

* cited by examiner

METERING CLOUD WORKLOADS AT EDGE COMPUTING DEVICES

BACKGROUND

Software metering allows cloud administrators to monitor and manage execution of workloads in the cloud. Such monitoring can be useful for managing cloud-resources, managing cloud service subscriptions, and billing for execution of cloud-based workflows. However, execution of cloud-provided workloads can also be allocated to one or more edge computing devices, and accurate and secure workload metering based on actual use at edge computing devices is not available for cloud-based workloads that execute on the edge computing devices.

SUMMARY

In at least one implementation, the disclosed technology provides metering execution of an application module at an edge computing device. A secure workload package is transmitted securely from a workload provisioning service to the edge computing device. The secure workload package includes the application module, a trusted metering application, and a provisioning service authentication token. The provisioning service authentication token is verified in the secure workload package based on an edge device authentication token generated at the edge computing device. The trusted metering application is executed in a trusted execution environment of the edge computing device, responsive to verifying the provisioning service authentication token. The application module of the edge computing device is executed, wherein the trusted metering application is configured to monitor execution metrics of the application module on the edge computing device. The execution of the application module is managed based on the monitored execution metrics.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Cloud computing can include workloads executed in the cloud and/or workloads provided from a cloud-service over a communications network for execution on edge computing devices. A cloud service providing such workloads for execution on an edge computing device may license the use of such workloads based on the actual use of the workload on the edge computing device, but securely tracking such actual use at the edge computing device is challenging. For example, a knowledgeable user can alter a device's date and time settings, block an application module from re-connecting to the cloud service, hack the workload, etc. to circumvent the metering efforts by the cloud service.

Because accurate and secure workload metering of cloud-provided workloads based on actual use is not available for cloud-based workloads that execute on edge computing devices, gross approximations that can be monitored in the cloud can be used for managing and billing for workload execution based on an anticipated use pattern over a calendar-based licensing period, a monitored number of communications with the cloud computing system, and other rough metrics. For example, a user may license a workload for execution on an edge computing device for six months, regardless of how much the user actually uses that workload on the edge computing device. In contrast, the described technology provides an accurate, secure workload metering technique using a trusted metering application at an edge computing device that can generate, authenticate, consume, count and/or track a set of metering unit types based on actual execution of a workload on an edge computing device.

Figure 1:
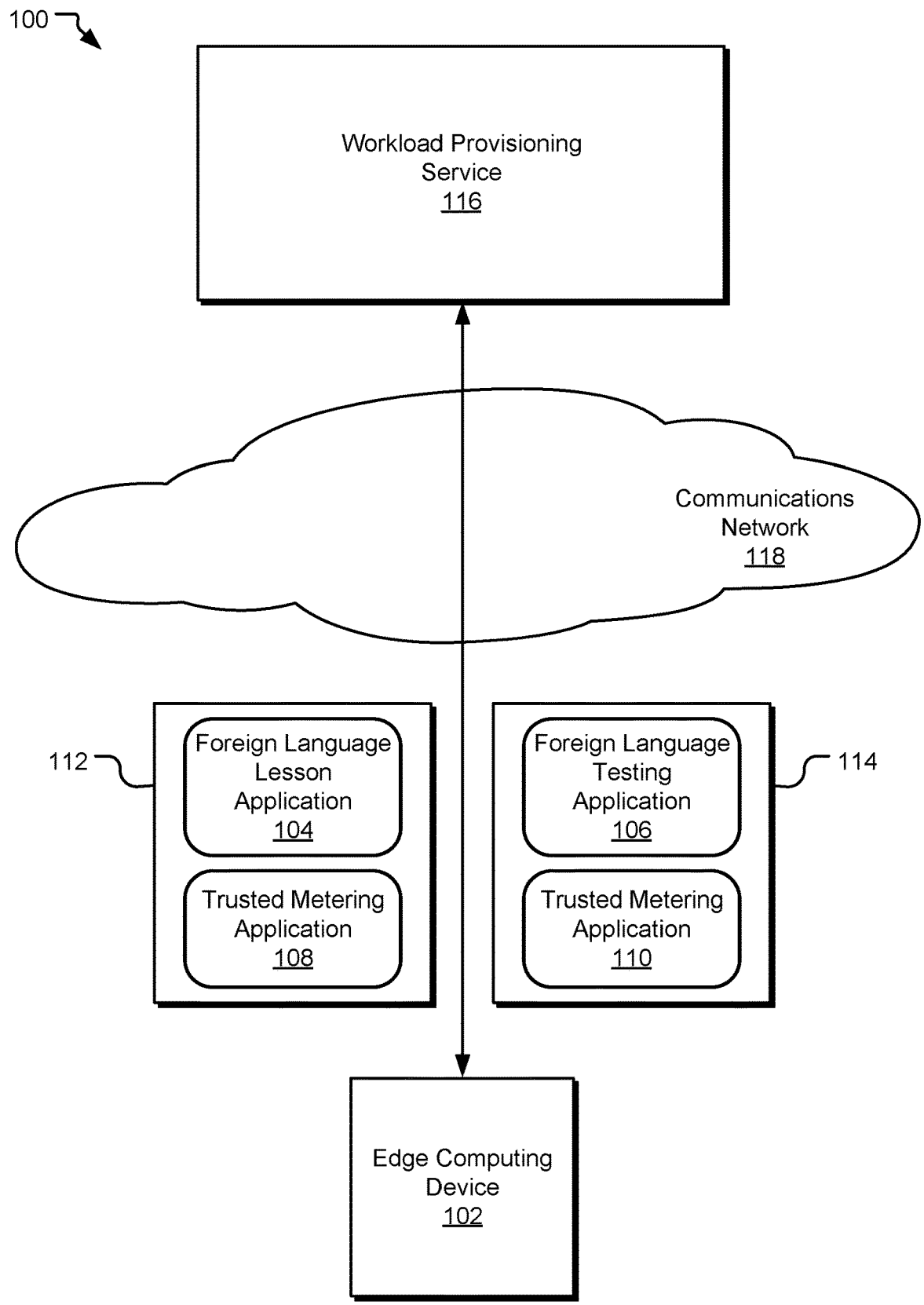
FIG. 1 illustrates an example system for metering workloads at an edge computing device.

FIG. 1 illustrates an example system 100 for metering workloads at an edge computing device 102, including without limitation a tablet computer, mobile phone, or an Internet of Things (IoT) device, executing a foreign language lesson application 104 and a foreign language testing application 106. Such applications can include multiple application modules, one or more of which can be metered by one or more trusted metering applications. The scenario illustrated in FIG. 1 represents a user subscribing to 30 hours of online foreign language lessons and 3 hours of foreign language tests from an app store (represented by a workload provisioning service 116). When the user downloads the foreign language applications across a communications network 118 from the app store, the app store securely bundles the foreign language lesson application 104 and the associated trusted metering application 108 are securely bundled in a secure cloud workload package 112 and the foreign language testing application 106 and the associated trusted metering application 110 in a secure cloud workload package 114. In one implementation, the secure cloud workload packages 112 and 114 are encrypted by the app store using a package encryption key that is unique to the edge computing device 102. In another implementation, the secure cloud workload packages 112 and 114 are encrypted in such a way that the edge computing device 102 can decrypt them, although this decryption need not be unique to the edge computing device 102. In yet another implementation, such encryption is optional. When encryption is employed, communications (including packages, metering results, updates, and other data transfers in either or both directions may be encrypted using the same or different keys).

In the illustrated scenario, actual use of the foreign language lesson application 104 and a foreign language testing application 106 at the edge computing device is metered separately for each application by a trusted metering application 108 and a trusted metering application 110, respectively, although multiple applications may be metered by a shared trusted metering application in other implementations. The foreign language lesson application 104 and the foreign language testing application 106 may be executed within the normal user and/or kernel modes of the operating system of the edge computing device 102. In contrast, the trusted metering application 108 and a trusted metering application 110 are executed within a trusted execution environment (TEE) of the edge computing device 102.

Execution of the foreign language lesson application 104 and the foreign language testing application 106 is dependent upon the trusted metering applications 108 and 110 so as to condition continued execution of the modules of the applications 104 and 106 on the metering provided by the trusted metering applications 108 and 110. For example, in one implementation, a module of the foreign language lesson application 104 (running in user mode of the operating system) makes calls to the trusted metering applications 108 (running in the TEE) as a precondition to executing certain functionality.

Calls by one or more modules of the foreign language lesson application 104 to the trusted metering application 108 can support at least two types of functionality related to metering: (1) informing the trusted metering application 108 that the user is actually executing functionality in the foreign language lesson application 104 that should be monitored by the trusted metering application 108, and (2) checking with the trusted metering application 108 to confirm various conditions applicable to the user and/or the associated licensing and other business relationships. As for the first type of call, for example, the foreign language lesson application 104 can call the trusted metering application 108 with "chargeable" execution starts (e.g., a timed lesson) and ends, allowing the trusted metering application 108 to keep track of the chargeable execution time, which can be communicated back to the cloud for billing, license compliance, etc. As for the second type of call, for example, a module of the foreign language lesson application 104 can call the trusted metering application 108 before executing some licensed functionality in the foreign language lesson application 104. The trusted metering application 108 can then determine whether the user is still authorized to execute that functionality by checking up-to-date metered execution for the foreign language lesson application 104 against licensing terms and/or other parameters stored in a policy database in the TEE. If the user has expended all authorized use of the foreign language lesson application 104, the trusted metering application 108 can signal the foreign language lesson application 104 to block execution of that functionality, at least until additional execution has been paid for or otherwise authorized.

In one implementation, with both types of calls, the trusted metering application 108 holds one or more instances of gateway functionality and/or content (collectively, "gateway instances") on which the foreign language lesson application 104 is dependent. At predetermined points of operation, the foreign language lesson application 104 calls the gateway instances in order to continue operation or provide the user with access to particular functionality or content. For example, a gateway instance can include a proprietary algorithm, selected media files, or special configuration parameters that the foreign language application 104 uses to deliver its intended operation.

In various implementations, calls to such gateway instances may be implemented as follows, although other implementations may be implemented differently:
1. The foreign language lesson application 104 makes a function call to the trusted metering application 108
2. As part of the call language, the foreign language lesson application 104 delivers inputs that requires a transformation using a gateway instance of the trusted metering application 108 (e.g. algorithmic or parametric processing)
3. The trusted metering application 108 processes the input inside of the trusted execution environment of the edge computing device 102 without divulging the confidentiality of the gateway instance (e.g., the proprietary algorithm or the special parameters)
4. The trusted metering application 108 delivers results of the call to the foreign language lesson application 104, while recording the metered consumption associated with the gateway instance (e.g., the number of calls to the gateway instance, the total amount of time that the foreign language application 104 was executed between such calls, the absolute timestamps of such calls, the specific parameters used in or the results returned from each call)

By enforcing a dependency between the operation of the foreign language lesson application 104 and the trusted metering applications 108 (executed within the trusted execution environment of the edge computing device 102), the trusted metering application 108 can monitor the operation of the foreign language lesson application 104 and meter such operation against securely stored policies (e.g., metering policies defined based on licensing or subscription terms). In one implementation, such dependency enforces compliance with the metering policies and can a prevent a dishonest user from subverting the foreign language lesson application 104 by avoiding or bypassing the call to the trusted metering application 108. In some implementations, the gateway instances can be provisioned into the trusted metering application 108 as part of the workload provisioning.

It should be understood that metered execution can be conditioned on one or more of the following without limitation: an execution time/date deadline, an execution time period (e.g., 30 hours of execution), milestones (e.g., Lesson 2 cannot be executed until Lesson 1 is completed and the associated test from the foreign language lesson application 106 has been passed), a warranty period (e.g., as it pertains to support functionality), geographical limitations, age limitations, telemetry conditions (e.g., not while driving a car), and other criteria. Accordingly, if the monitored data (e.g., collected in association with the gateway instances) does not satisfy one or more metering policies, execution of the foreign language less application 104 can be constrained (e.g., terminated, suspended, or executable with limited functionality) or can incur additional financial charges.

Figure 2:
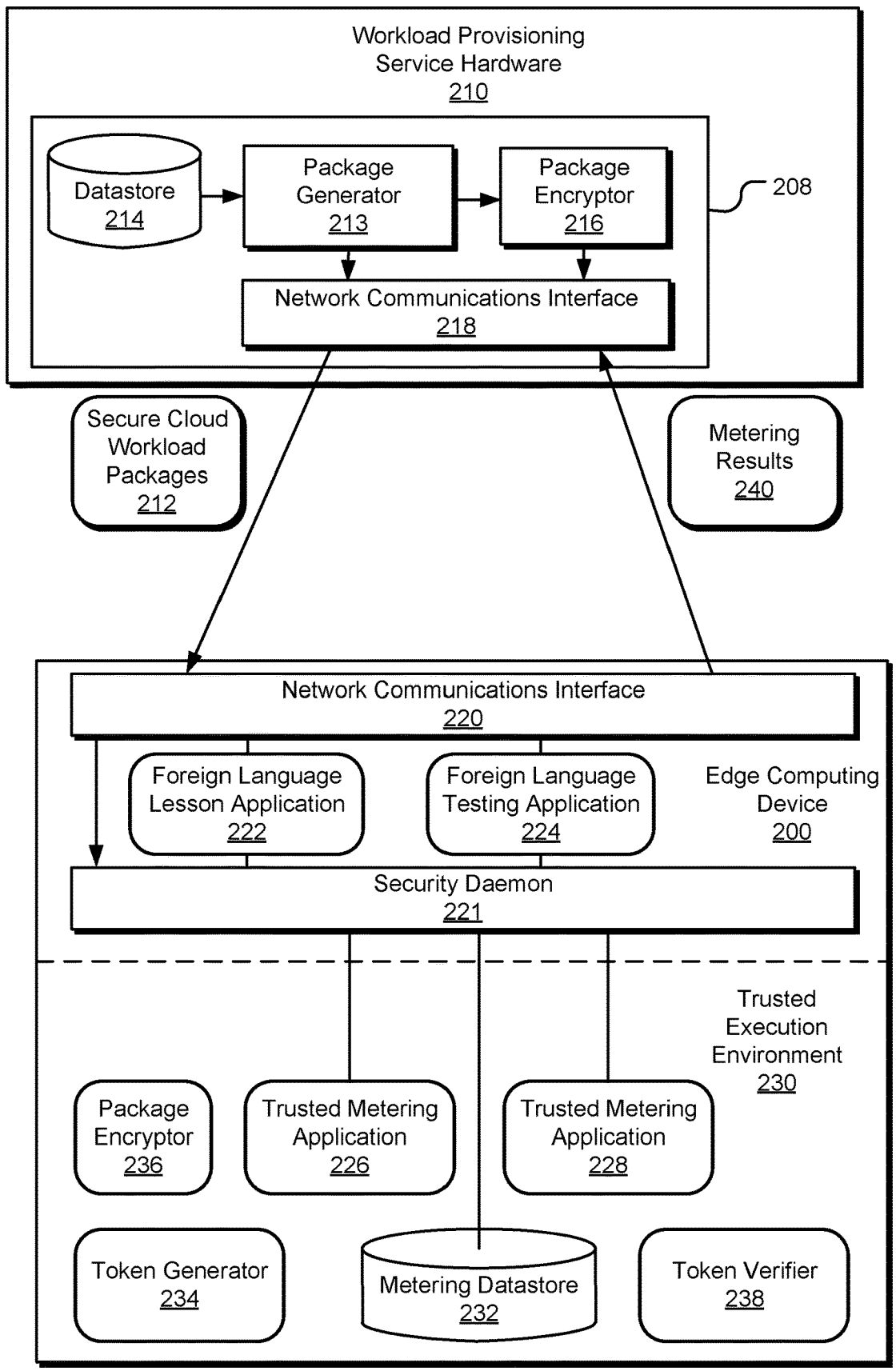
FIG. 2 illustrates an example edge computing device in the context of metering a workload at the example edge computing device.

FIG. 2 illustrates an example edge computing device 200 in the context of metering a workload at the example edge computing device 200. The edge computing device 200 has requested two applications (e.g., a foreign language lesson application 202 and a foreign language testing application 206) from a workload provisioning service 208 executing in the cloud on workload provisioning service hardware 210. The edge computing device 200 and the workload provisioning service hardware 210 communicate through respective network communications interfaces 218 and 220 across a communications network (not shown in FIG. 2), such as the Internet.

In one implementation, as part of the request (or separate from the request), the edge computing device 200 and the workload provisioning service 208 exchange their public keys and a nonce (e.g., a random or pseudo-random number issued in an authentication protocol). The edge computing device 200 also provides a device identifier to the workload provisioning service 208, the device identifier uniquely identifying the edge computing device 200.

In one implementation, an anonymous key agreement protocol, such as the Elliptic-Curve Diffie-Hellman (ECDH)

protocol, is used to establish a shared secret across an insecure channel in the communications network, although other secure methods of exchange may be employed. The shared secret can then be used as a shared private key (or to derive such a shared private key) to secure an authentication token (e.g., a provisioning service authentication token and/or an edge device authentication token) that is used to verify the authenticity of one or more secure cloud workload packages 212 delivered to the edge computing device 200 to service the application request by the edge computing device 200. An example of an anonymous key agreement functions is provided as follows:

$$Secret=ECDH(PubKeyD,PubKeyC,nonce)$$

where ECDH defines a function implementing the ECDH protocol, PubKeyD indicates the public key of the edge computing device 200, the PubKeyC indicates the public key of the workload provisioning service 208, and nonce indicates the nonce shared between the edge computing device 200 and the workload provisioning service 208.

Having generated the key that can also be securely generated by the edge computing device 200, a package generator 213 of the workload provisioning service 208 extracts the requested workload(s) and the associated trusted metering application(s) from a packaging datastore 214. The package generator 213 may also extract other provisioning data from the packaging datastore 214, including without limitation one or more metering policies, one or more application identifiers, one or more application module identifiers, and a workload provisioning service identifier.

The one or more metering policies define the terms of the metering performed by the trusted metering applications included in each of the secure cloud workload packages 212. For example, the one or more metering policies can define a period of monitored execution allowed by the license with respect to one of the requested applications (e.g., 30 hours of foreign language lesson application execution). The one or more application identifiers uniquely identify the requested applications (e.g., a single application, multiple applications, a single application module, or multiple application modules may be included in a single secure workload package). The one or more application module identifiers can uniquely identify individual applications modules of the requested applications to allow separate metering for different modules of an application. For example, a single foreign language application can have both audio and video lessons, and these lessons may have different licensing terms and constraints. The workload provisioning service identifier uniquely identifies the workload provisioning service 208 that has provided the secure cloud workload packages 212. Various combinations of these parameters (whether including all or some of these parameters) can constitute a claim associated with the requested applications that can be used to authenticate the secure cloud workload packages 212.

To configure one of the secure cloud workload packages 212 for authentication, the package generator 213 generates a provisioning service authentication token based on at least the key and the claim. For example, in one implementation, the provisioning service authentication token is generated as key-based hash message authentication code (HMAC) using a cryptographic hash function and the key derived from the shared secret:

$$Token=HMAC(key,metering\ policy,deviceID,cloud\text{-}ID,appID,moduleID),$$

where HMAC defines a cryptographic hash function, key indicates the shared secret or a key derived therefrom, metering policy indicates the one or more metering policies defined by the workload provisioning service 208 (e.g., by the app store license), deviceID indicates the device identifier of the edge computing device 200, cloudID indicates the identifier of the workload provisioning service 208, appID indicates one or more application identifiers of the requested application(s), and moduleID indicates one or more specific application modules of the requested application(s). One or more of these parameters may be omitted in various implementations, and other parameters may be added.

Responsive to the request and generation of the provisioning service authentication token, the workload provisioning service 208 prepares secure cloud workload package(s) 212. The generated provisioning service authentication token, the claim, the requested workload(s) and the associated trusted metering application(s) are bundled in a package for communication to the edge computing device 200 through the network communications interface 218. As previously discussed, the one or more secure cloud workload packages 212 may also be encrypted by a package encryptor 216, such as by a separate public-private key pair, to provide secure communication between the edge computing device 200 and the workload provisioning service 208.

When the secure cloud workload packages 212 are received through the network communications interface 220 at the edge computing device 200, the packaged foreign language lesson application 222 and the foreign language testing application 224 are installed for execution in the user mode of the operating system of the edge computing device 200, and the provisioning service authentication token, claim and trusted metering applications 226 and 228 are passed through a security daemon 221 into the TEE 230 of the edge computing device 200 and stored in a secure metering datastore 232. If the secure cloud workload packages 212 are encrypted, then a package encryptor 236 decrypts the packages before distributing their components.

It is assumed that the edge computing device 200 generates the shared secret using ECDH, the public keys, and the nonce, although such generation can be accomplished upon receipt of the packages. A token generator 234 executes in the TEE 230 and extracts the shared secret, the received provisioning service authentication token, and the received claim from the metering datastore 232, re-generates its own edge device authentication token using its own version of the shared secret, its own device identifier and other elements of the claim. A token verifier 238 evaluates the two versions of the authentication token to verify that the provisioning service authentication token received in each of the packages is valid. If the received provisioning service authentication token is deemed valid, then the packaged application (e.g., the foreign language lesson application 222) and the associated trusted metering application (e.g., the trusted metering application 226) are authorized for execution on the edge computing device 200.

During execution of the foreign language lesson application 222, the application makes metering calls through the security daemon 221 to the associated trusted metering application 226. Such metering calls can include without limitation start/stop calls to trigger/stop metering, authorization calls to determine whether the application 222 is still authorized to execute pursuant to the metering policies and data, whether a support module of the application 222 is still available because the warranty period has not yet expired, etc. Accordingly, depending on the results of such metering calls to the trusted metering application, execution of the foreign language lesson application 222 may continue or be constrained (e.g., limited in functionality, terminated, deleted).

Furthermore, the trusted metering application 222 monitors the execution of the foreign language lesson application 222 through these metering calls, and if instructed by the metering policy, evaluates the execution against the metering policy (e.g., to ensure that it is compliant with a license) and/or reports back metering data to the cloud (e.g., to the workload provisioning service 208), as represented by the metering results 240. The metering results 240 may be encrypted by the package encryptor 236 of the edge computing device 200 and subsequently decrypted upon receipt by the package encryptor 216 of the workload provisioning service 208.

Figure 3:
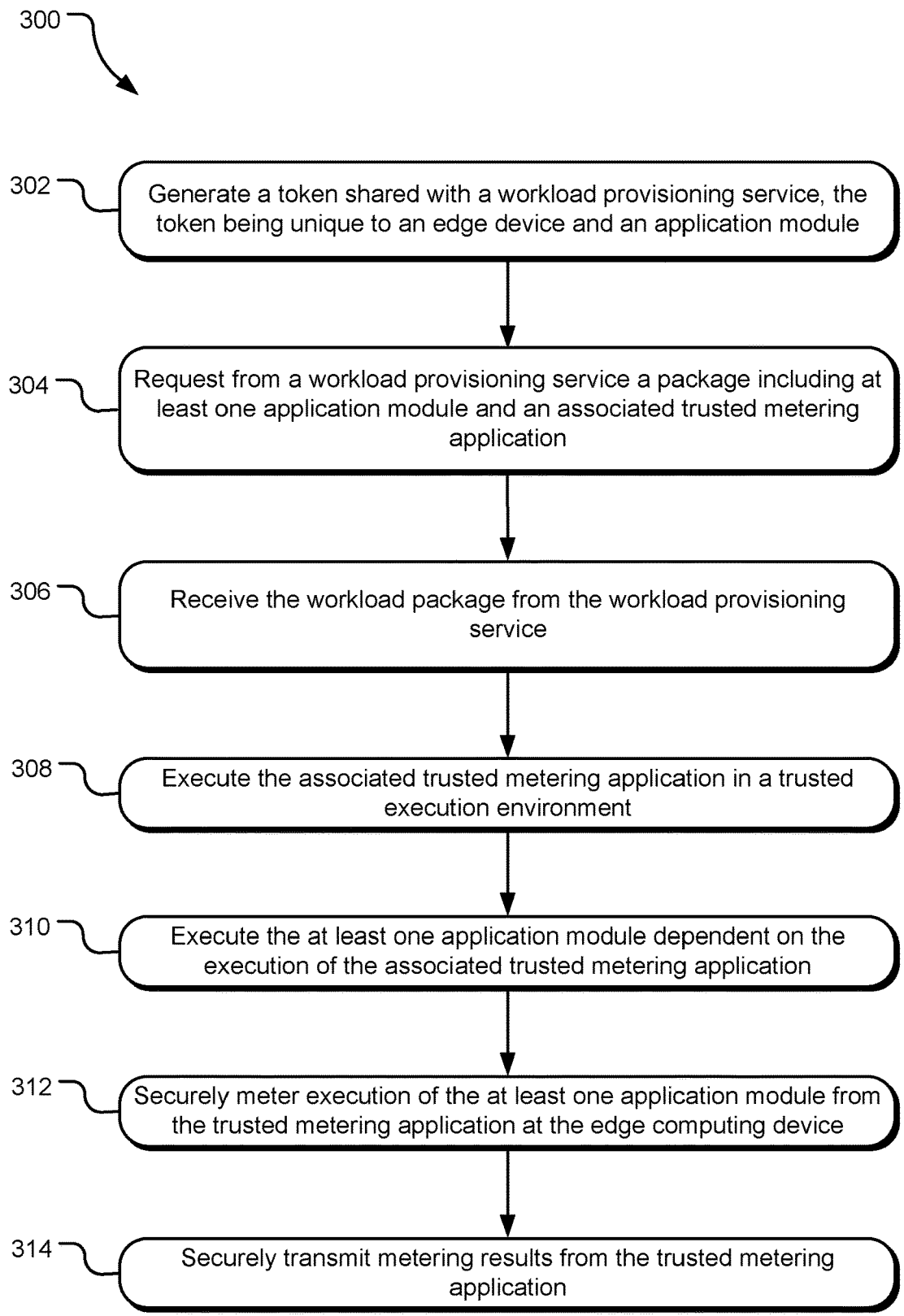
FIG. 3 illustrates example operations for metering execution of an application module at an edge computing device.

FIG. 3 illustrates example operations 300 for metering execution of an application module at an edge computing device. A token generation operation 302 generates a provisioning service authentication token shared with a workload provisioning service. The provisioning service authentication token is unique to the edge computing device requesting the workload and to at least one application module of the requested workload. The provisioning service authentication token may also be unique to the application, the workload provisioning service, and the associated claim.

A requesting operation 304 requests the workload provisioning service to provide a secure cloud workload package including at least an application module and an associated trusted metering application. The workload provisioning service packages the provisioning service authentication token in the secure cloud workload package, along with a claim (e.g., a combination of one or more of the following parameters: one or more metering policies, one or more application identifiers, one or more application module identifiers, and a workload provisioning service identifier). A receiving operation 306 receives the secure cloud workload package from the workload provisioning service at the edge computing device.

An execution operation 308 executes the trusted metering application of the secure cloud workload package in a trusted execution environment of the edge computing device. Another execution operation 310 executes at least one application module of the requested application at the edge computing device. A metering operation 312 securely meters execution of the at least one application module via the trusted metering application executing in the trusted execution environment of the edge computing device. A transmitting operation 314 securely transmits metering results from the trusted metering application in the edge computing device to the cloud.

Figure 4:
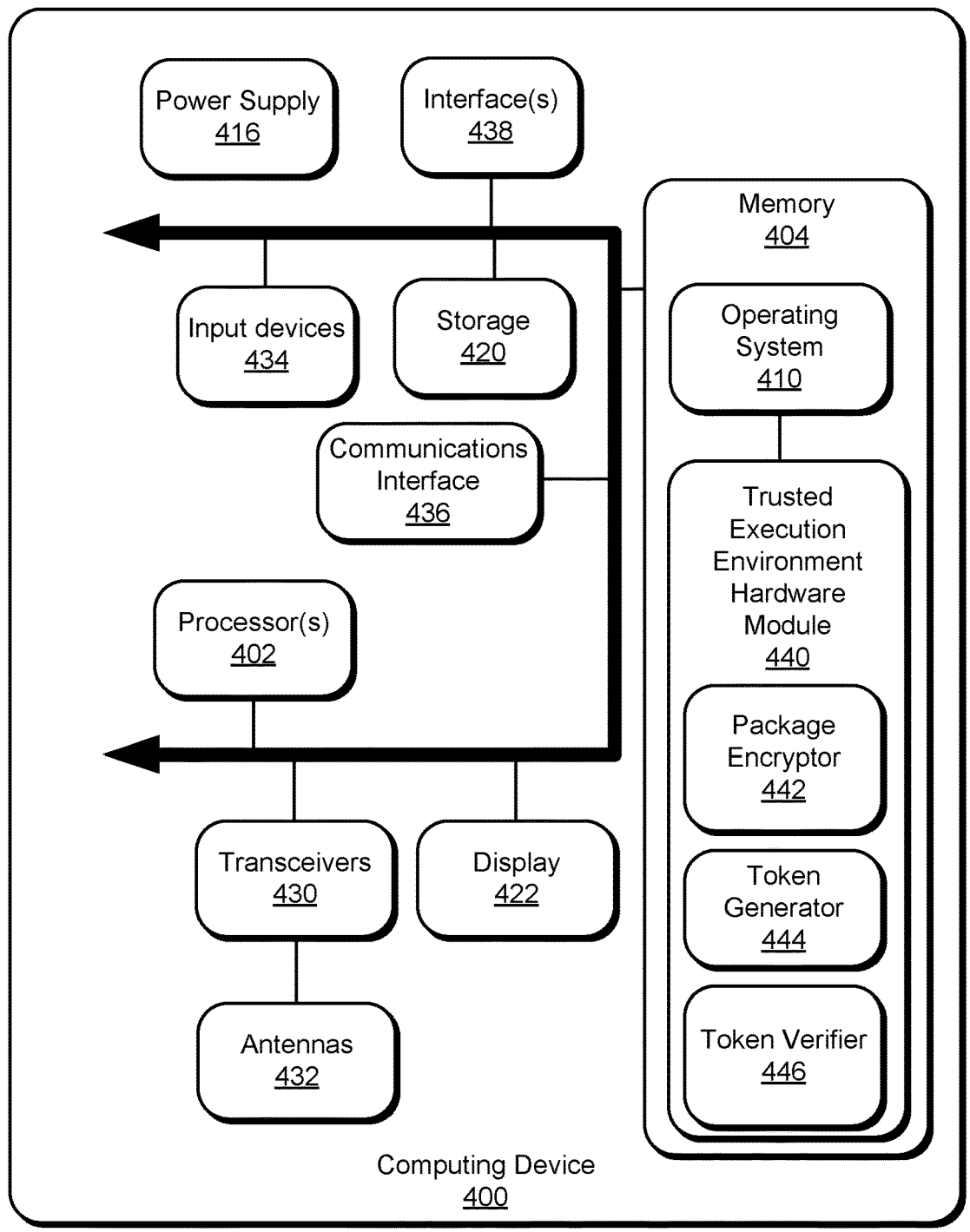
FIG. 4 illustrates example workload provisioning service hardware for use in metering a workload at an edge computing device.

FIG. 4 illustrates an example edge computing device for use in metering a workload at an edge computing device. The example computing device 400 may be used to process a packaged secure cloud workload received from a workload provisioning service. The computing device 400 may be a client device, such as a laptop, mobile device, desktop, tablet, or a server/cloud device. The computing device 400 includes one or more processor(s) 402, and a memory 404. The memory 404 generally includes both volatile memory (e.g., RAM) and non-volatile memory (e.g., flash memory). An operating system 410 resides in the memory 404 and is executed by the processor(s) 402.

In an example edge computing device, as shown in FIG. 4, one or more modules or segments, such as a package encryptor 442, a token generator 444, and a token verifier 446, applications, application modules, and other modules, are loaded into the operating system 410 on the memory 404 and/or storage 420 and installed in and executed by the trusted computing environment hardware 440 and/or other processor(s) 402. The trusted computing environment hardware 440 also includes memory for storing a metering datastore, cryptographic keys, tokens, claims, policies, and other secured data. The storage 420 may be local to the computing device 400 or may be remote and communicatively connected to the computing device 400 and may include another server. The storage 420 may store resources that are requestable by client devices (not shown).

Alternatively, in workload provisioning service hardware, a computing device similar to that of the computing device 400 can include one or more modules or segments (not shown), such as a package encryptor and a package generator, applications, application modules, and other modules, are loaded into the operating system 410 on the memory 404 and/or storage 420 and executed by the processor(s) 402. The workload provisioning service hardware also includes memory 404 for storing a packaging datastore, cryptographic keys, tokens, claims, policies, and other secured data. The storage 420 may be local to the computing device 400 or may be remote and communicatively connected to the computing device 400 and may include another server. The storage 420 may store resources that are requestable by client devices (not shown).

The computing device 400 includes a power supply 416, which is powered by one or more batteries or other power sources and which provides power to other components of the computing device 400. The power supply 416 may also be connected to an external power source that overrides or recharges the built-in batteries or other power sources.

The computing device 400 may include one or more communication transceivers 430 which may be connected to one or more antenna(s) 432 to provide network connectivity (e.g., mobile phone network, Wi-Fi®, Bluetooth®) to one or more other servers and/or client devices (e.g., mobile devices, desktop computers, or laptop computers). The computing device 400 may further include a network adapter 436, which is a type of communication device. The computing device 400 may use the adapter and any other types of communication devices for establishing connections over a wide-area network (WAN) or local-area network (LAN). It should be appreciated that the network connections shown are exemplary and that other communications devices and means for establishing a communications link between the computing device 400 and other devices may be used.

The computing device 400 may include one or more input devices 434 such that a user may enter commands and information (e.g., a keyboard or mouse). These and other input devices may be coupled to the server by one or more interfaces 438 such as a serial port interface, parallel port, or universal serial bus (USB). The computing device 400 may further include a display 422, such as a touch screen display.

The computing device 400 may include a variety of tangible processor-readable storage media and intangible processor-readable communication signals. Tangible processor-readable storage can be embodied by any available media that can be accessed by the computing device 400 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 400. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method of metering execution of an application module at an edge computing device includes receiving a secure workload package transmitted securely from a workload provisioning service to the edge computing device. The secure workload package includes the application module, a trusted metering application, and a provisioning service authentication token. The method also includes verifying the provisioning service authentication token in the secure workload package based on an edge device authentication token generated at the edge computing device, executing the trusted metering application in a trusted execution environment of the edge computing device, responsive to verifying the provisioning service authentication token, executing the application module of the edge computing device, the trusted metering application being configured to monitor execution metrics of the application module on the edge computing device, and managing the execution of the application module based on the monitored execution metrics.

Another example method of any preceding method is provided wherein the provisioning service authentication token is generated based on a secret shared by the provisioning workload service and the edge computing device. This example method further includes generating the edge device authentication token in the trusted execution environment of the edge computing device based on the shared secret.

Another example method of any preceding method is provided wherein the provisioning service authentication token is generated based on a secret shared by the provisioning workload service and the edge computing device without communicating the shared secret between the edge computing device and the workload provisioning service.

Another example method of any preceding method is provided wherein the provisioning service authentication token is unique to the edge computing device and the secure workload package.

Another example method of any preceding method is provided wherein the generating operation include generating the edge device authentication token based on a shared secret and a claim.

Another example method of any preceding method is provided wherein the claim includes a metering policy, a provisioning service identifier, an edge computing device identifier, and an application module identifier.

Another example method of any preceding method is provided wherein the generating operation includes generating the edge device authentication token using a cryptographic hash function based on a shared secret, a metering policy, a provisioning service identifier, an edge computing device identifier, and an application module identifier.

Another example method of any preceding method further includes securely transmitting the monitored execution metrics from the edge computing device to the workload provisioning service.

Another example method of any preceding method is provided wherein the managing operation includes constraining the execution of the application module by preventing execution of the application module, responsive to a determination that the monitored execution metrics do not satisfy a metering policy communicated in the secure workload package.

An example edge computing device for metering execution of an application module at the edge computing device includes a communications interface configured to receive a secure workload package transmitted securely from a workload provisioning service to the edge computing device. The secure workload package includes the application module, a trusted metering application, and a provisioning service authentication token. The example edge computing device also includes a token verifier coupled to receive the secure workload package and configured to verify the provisioning service authentication token in the secure workload package based on an edge device authentication token generated at the edge computing device, trusted execution environment hardware to execute the trusted metering application in a trusted execution environment of the edge computing device, responsive to verifying the provisioning service authentication token, one or more hardware processors configured to execute the application module of the edge computing device, wherein the trusted metering application is configured to monitor execution metrics of the application module on the edge computing device and to manage the execution of the application module based on the monitored execution metrics.

Another example edge computing device of any preceding edge computing device is provided wherein the provisioning service authentication token is generated based on a secret shared by the provisioning workload service and the edge computing device. This example edge computing device further includes a token generator in the edge computing device configured to generate the edge device authentication token in the trusted execution environment of the edge computing device based on the shared secret.

Another example edge computing device of any preceding edge computing device is provided wherein the provisioning service authentication token is generated based on a secret shared by the provisioning workload service and the edge computing device without communicating the shared secret between the edge computing device and the workload provisioning service.

Another example edge computing device of any preceding edge computing device is provided wherein the provisioning service authentication token is unique to the edge computing device and the secure workload package.

Another example edge computing device of any preceding edge computing device is provided wherein the edge device authentication token is generated based on a shared secret and a claim, and the claim includes at least one of a metering policy, a provisioning service identifier, an edge computing device identifier, and an application module identifier.

One or more example tangible processor-readable storage media embodied with instructions for executing on one or more processors and circuits of a computing device a process for metering execution of an application module at an edge computing device is provided wherein the process includes receiving a secure workload package transmitted securely from a workload provisioning service to the edge computing device. The secure workload package includes the application module, a trusted metering application, and a provisioning service authentication token. The process also includes verifying the provisioning service authentication token in the secure workload package based on an edge device authentication token generated at the edge computing device, executing the trusted metering application in a trusted execution environment of the edge computing device, responsive to verifying the provisioning service authentication token, executing the application module of the edge computing device, the trusted metering application being configured to monitor execution metrics of the application module on the edge computing device, and managing the execution of the application module based on the monitored execution metrics.

Other one or more example tangible processor-readable storage media of and preceding tangible processor-readable storage media is provided wherein the provisioning service authentication token is generated based on a secret shared by the provisioning workload service and the edge computing device, wherein the process further includes generating the edge device authentication token in the trusted execution environment of the edge computing device based on the shared secret without communicating the shared secret between the edge computing device and the workload provisioning service.

Other one or more example tangible processor-readable storage media of and preceding tangible processor-readable storage media is provided wherein the provisioning service authentication token is unique to the edge computing device and the secure workload package.

Other one or more example tangible processor-readable storage media of and preceding tangible processor-readable storage media is provided wherein the generating operation includes generating the edge device authentication token based on a shared secret and a claim.

Other one or more example tangible processor-readable storage media of and preceding tangible processor-readable storage media is provided wherein the claim includes a metering policy, a provisioning service identifier, an edge computing device identifier, and an application module identifier.

Other one or more example tangible processor-readable storage media of and preceding tangible processor-readable storage media is provided wherein the generating operation includes generating the edge device authentication token using a cryptographic hash function based on a shared secret, a metering policy, a provisioning service identifier, an edge computing device identifier, and an application module identifier.

An example system for metering execution of an application module at an edge computing device includes means for receiving a secure workload package transmitted securely from a workload provisioning service to the edge computing device. The secure workload package includes the application module, a trusted metering application, and a provisioning service authentication token. The system also includes means for verifying the provisioning service authentication token in the secure workload package based on an edge device authentication token generated at the edge computing device, means for executing the trusted metering application in a trusted execution environment of the edge computing device, responsive to verification the provisioning service authentication token, means for executing the application module of the edge computing device, the trusted metering application being configured to monitor execution metrics of the application module on the edge computing device, and means for managing the execution of the application module based on the monitored execution metrics.

Another example system of any preceding system is provided wherein the provisioning service authentication token is generated based on a secret shared by the provisioning workload service and the edge computing device. This example system further includes means for generating the edge device authentication token in the trusted execution environment of the edge computing device based on the shared secret.

Another example system of any preceding system is provided wherein the provisioning service authentication token is generated based on a secret shared by the provisioning workload service and the edge computing device without communicating the shared secret between the edge computing device and the workload provisioning service.

Another example system of any preceding system is provided wherein the provisioning service authentication token is unique to the edge computing device and the secure workload package.

Another example system of any preceding system is provided wherein the means for generating include means for generating the edge device authentication token based on a shared secret and a claim.

Another example system of any preceding system is provided wherein the claim includes a metering policy, a provisioning service identifier, an edge computing device identifier, and an application module identifier.

Another example system of any preceding system is provided wherein the means for generating includes means for generating the edge device authentication token using a cryptographic hash function based on a shared secret, a metering policy, a provisioning service identifier, an edge computing device identifier, and an application module identifier.

Another example system of any preceding system further includes means for securely transmitting the monitored execution metrics from the edge computing device to the workload provisioning service.

Another example system of any preceding system is provided wherein the means for managing includes means for constraining the execution of the application module by preventing execution of the application module, responsive to a determination that the monitored execution metrics do not satisfy a metering policy communicated in the secure workload package.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of metering execution of an application module at an edge computing device, the method comprising:
   receiving a secure workload package transmitted securely from a workload provisioning service to the edge computing device, the secure workload package including the application module, a trusted metering application, and a provisioning service authentication token;
   verifying the provisioning service authentication token in the secure workload package based on an edge device authentication token generated at the edge computing device, wherein the provisioning service authentication token is generated based on a secret shared by the workload provisioning service and the edge computing device without communicating the shared secret between the edge computing device and the workload provisioning service;
   executing the trusted metering application in a trusted execution environment of the edge computing device, responsive to verifying the provisioning service authentication token;
   executing the application module in the edge computing device, the trusted metering application being configured to monitor a chargeable execution duration during execution of the application module on the edge computing device; and
   managing the execution of the application module based on the monitored chargeable execution duration.

2. The method of claim 1 further comprising÷generating the edge device authentication token in the trusted execution environment of the edge computing device based on the shared secret.

3. The method of claim 1 wherein the provisioning service authentication token is unique to the edge computing device and the secure workload package.

4. The method of claim 1 wherein the generating operation comprises:
   generating the edge device authentication token further based on claim.

5. The method of claim 4 wherein the claim includes a metering policy, a provisioning service identifier, an edge computing device identifier, and an application module identifier.

6. The method of claim 1 wherein the generating operation comprises:
   generating the edge device authentication token using a cryptographic hash function based on the shared secret, a metering policy, a provisioning service identifier, an edge computing device identifier, and an application module identifier.

7. The method of claim 1 further comprising:
   securely transmitting the monitored chargeable execution duration from the edge computing device to the workload provisioning service.

8. The method of claim 1 wherein the managing operation comprises:
   monitoring execution metrics by the trusted metering application; and
   constraining the execution of the application module by preventing execution of the application module, responsive to a determination that the monitored execution metrics do not satisfy a metering policy communicated in the secure workload package.

9. An edge computing device for metering execution of an application module at the edge computing device, the edge computing device comprising:
   a communications interface configured to receive a secure workload package transmitted securely from a workload provisioning service to the edge computing device, the secure workload package including the application module, a trusted metering application, and a provisioning service authentication token;
   a token verifier coupled to receive the secure workload package and configured to verify the provisioning service authentication token in the secure workload package based on an edge device authentication token generated at the edge computing device, wherein the provisioning service authentication token is generated based on a secret shared by the provisioning workload service and the edge computing device without communicating the shared secret between the edge computing device and the workload provisioning service;
   trusted execution environment hardware to execute the trusted metering application in a trusted execution environment of the edge computing device, responsive to verifying the provisioning service authentication token; and
   one or more hardware processors configured to execute the application module and the token verifier in the edge computing device, the trusted metering application being configured to monitor a chargeable execution duration during execution of the application module on the edge computing device and to manage the execution of the application module based on the monitored chargeable execution duration.

10. The edge computing device of claim 9 further comprising÷a token generator in the edge computing device configured to generate the edge device authentication token in the trusted execution environment of the edge computing device based on the shared secret.

11. The edge computing device of claim 9 wherein the provisioning service authentication token is unique to the edge computing device and the secure workload package.

12. The edge computing device of claim 9 wherein the edge device authentication token is generated further based on a claim, and the claim includes at least one of a metering policy, a provisioning service identifier, an edge computing device identifier, and an application module identifier.

13. One or more tangible processor-readable storage media embodied with instructions for executing on one or more processors and circuits of a computing device a process for metering execution of an application module at an edge computing device, the process comprising:
receiving a secure workload package transmitted securely from a workload provisioning service to the edge computing device, the secure workload package including the application module, a trusted metering application, and a provisioning service authentication token;
verifying the provisioning service authentication token in the secure workload package based on an edge device authentication token generated at the edge computing device, wherein the provisioning service authentication token is generated based on a secret shared by the provisioning workload service and the edge computing device without communicating the shared secret between the edge computing device and the workload provisioning service;
executing the trusted metering application in a trusted execution environment of the edge computing device, responsive to verifying the provisioning service authentication token;
executing the application module in the edge computing device, the trusted metering application being configured to monitor a chargeable execution duration during execution of the application module on the edge computing device; and
managing the execution of the application module based on the monitored chargeable execution duration.

14. The one or more tangible processor-readable storage media of claim 13 further comprising=generating the edge device authentication token in the trusted execution environment of the edge computing device based on the shared secret without communicating the shared secret between the edge computing device and the workload provisioning service.

15. The one or more tangible processor-readable storage media of claim 13 wherein the provisioning service authentication token is unique to the edge computing device and the secure workload package.

16. The one or more tangible processor-readable storage media of claim 13 wherein the generating operation comprises:
generating the edge device authentication token further based on a claim.

17. The one or more tangible processor-readable storage media of claim 16 wherein the claim includes a metering policy, a provisioning service identifier, an edge computing device identifier, and an application module identifier.

18. The one or more tangible processor-readable storage media of claim 13 wherein the generating operation comprises:
generating the edge device authentication token using a cryptographic hash function based on the shared secret, a metering policy, a provisioning service identifier, an edge computing device identifier, and an application module identifier.

19. The method of claim 1, wherein the workload provisioning service is executed on one or more different computing systems than the edge computing device.

20. The method of claim 1, wherein the operations of receiving the secure workload package, verifying the provisioning service authentication token, executing the trusted metering application, executing the application module, and managing the execution of the application module are performed by the edge computing device.

21. The method of claim 1, wherein the trusted execution environment is implemented by trusted computing hardware on the edge computing device.

22. The method of claim 4, wherein the claim includes at least one metering policy.

* * * * *